United States Patent [19]
Brown et al.

[11] Patent Number: 5,643,614
[45] Date of Patent: Jul. 1, 1997

[54] MOLD SEPARATOR APPARATUS

[76] Inventors: Robert L. Brown, 1357 Cosmos NW., Hartville, Ohio 44632; David E. Baxter, 2270 Tallmadge Rd., Ravenna, Ohio 44266; Gregory L. Baxter, 1093 Dayton St., Akron, Ohio 44310

[21] Appl. No.: 288,096

[22] Filed: Aug. 9, 1994

Related U.S. Application Data

[60] Division of Ser. No. 963,797, Oct. 20, 1992, Pat. No. 5,358,398, which is a continuation-in-part of Ser. No. 877,349, Apr. 30, 1992, which is a continuation of Ser. No. 621,675, Nov. 30, 1990, abandoned.

[51] Int. Cl.$^6$ .................................. B29C 45/00
[52] U.S. Cl. .................. 425/169; 425/556; 425/575; 425/589; 425/595; 425/DIG. 247
[58] Field of Search .................. 425/169, 225, 425/556, 575, 589, 595, DIG. 108, DIG. 200, DIG. 201, DIG. 239, DIG. 247

[56] References Cited

U.S. PATENT DOCUMENTS

| | | | |
|---|---|---|---|
| 1,935,794 | 11/1933 | Geyer . | |
| 2,536,120 | 1/1951 | Beare . | |
| 2,790,206 | 4/1957 | Cofek . | |
| 3,005,235 | 10/1961 | Patera . | |
| 3,151,196 | 9/1964 | Tipton | 425/DIG. 201 |
| 3,266,086 | 8/1966 | Markevitch | 425/DIG. 201 |
| 3,308,508 | 3/1967 | Schrenk . | |
| 3,412,432 | 11/1968 | Fuglsang-Madsen | 425/DIG. 201 |
| 3,506,755 | 4/1970 | Rudder et al. . | |
| 3,924,995 | 12/1975 | Crooks . | |
| 3,973,891 | 8/1976 | Yamada | 425/DIG. 201 |
| 3,982,869 | 9/1976 | Eggers . | |
| 3,986,804 | 10/1976 | Albright . | |
| 4,025,268 | 5/1977 | Taylor | 425/DIG. 201 |
| 4,111,623 | 9/1978 | Black . | |
| 4,128,378 | 12/1978 | Otsu . | |
| 4,186,161 | 1/1980 | Ulmschneider . | |
| 4,315,727 | 2/1982 | Black . | |
| 4,315,885 | 2/1982 | Lemelson . | |
| 4,352,654 | 10/1982 | Heimberger . | |
| 4,372,738 | 2/1983 | Black . | |
| 4,403,810 | 9/1983 | Bieneck . | |
| 4,424,015 | 1/1984 | Black . | |
| 4,468,368 | 8/1984 | Hafele . | |
| 4,561,626 | 12/1985 | Black . | |
| 4,575,328 | 3/1986 | Fierkens . | |
| 4,604,045 | 8/1986 | Black . | |
| 4,671,764 | 6/1987 | Hehl . | |
| 4,693,679 | 9/1987 | Marth . | |
| 4,751,029 | 6/1988 | Swanson | 425/DIG. 201 |
| 4,790,739 | 12/1988 | Manfredi . | |
| 4,836,960 | 6/1989 | Spector et al. | 425/DIG. 201 |
| 4,877,387 | 10/1989 | Fierkens . | |
| 4,961,888 | 10/1990 | Brown . | |
| 5,183,605 | 2/1993 | Brown et al. | 425/149 |
| 5,256,056 | 10/1993 | Brown et al. | 425/595 |

FOREIGN PATENT DOCUMENTS

| | | |
|---|---|---|
| 2335973 | 1/1975 | Germany . |
| 581642 | 10/1946 | United Kingdom . |
| 2158003 | 11/1985 | United Kingdom . |

*Primary Examiner*—James P. Mackey

[57] ABSTRACT

A method and apparatus for removing molded articles from a continuous, nonsynchronous system using multi-section, self-clamping molds. The apparatus is a mold separator-assembler having an elevator, and a horizontal position mover for disassembling the mold into sections, tracks for receiving sections of the self-clamping molds, and a track mover for moving the mold sections along their respective tracks to parallel, co-planar work stations. Once the molded article is removed at one of the work stations using an intermediate mechanism, the main sections are pre-treated and then reassembled using a second elevator and second horizontal position mover, for the next injection operation.

11 Claims, 12 Drawing Sheets

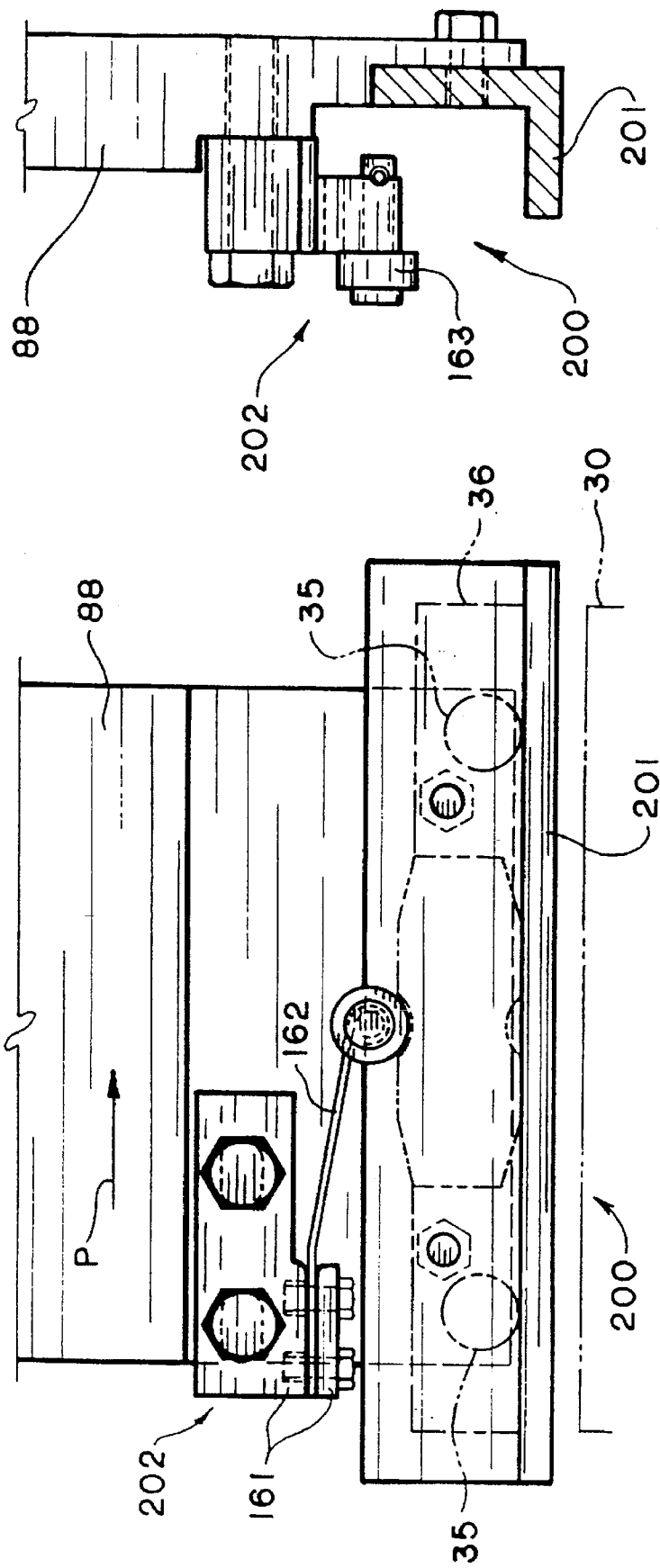

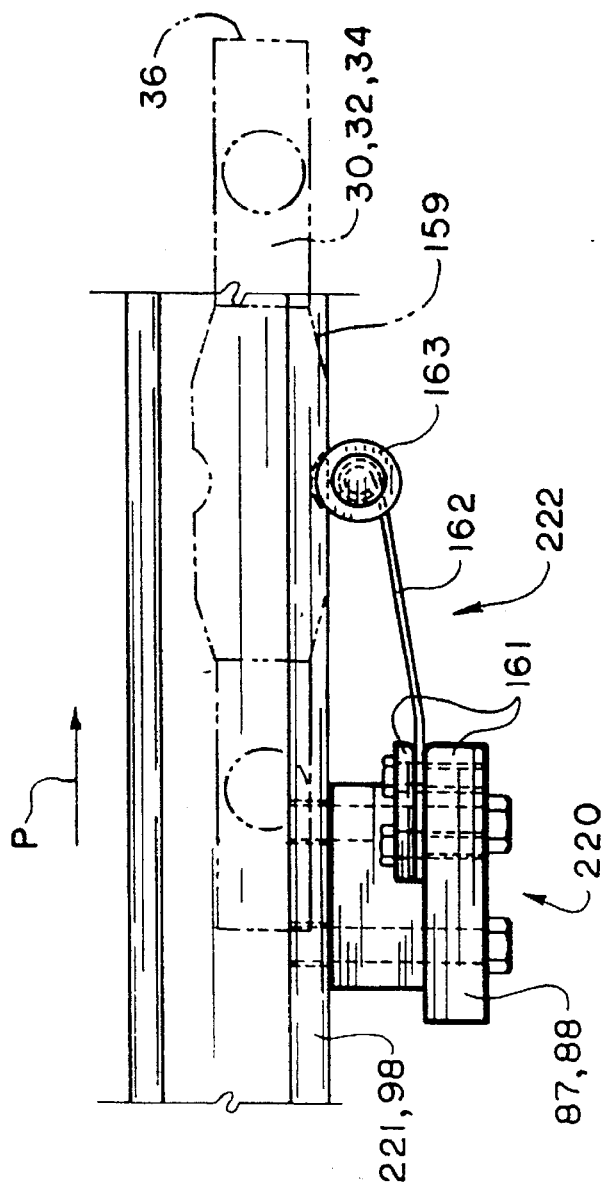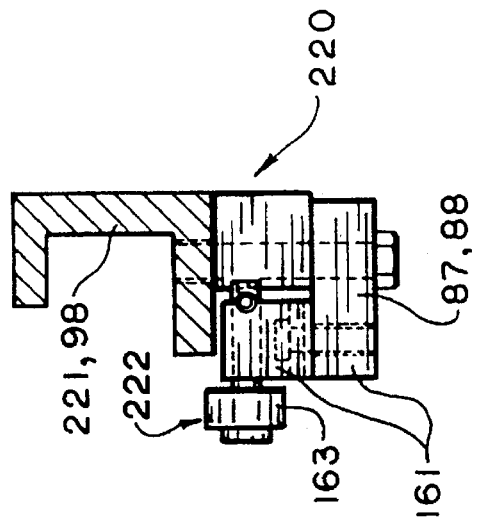

MOLD SEPARATOR APPARATUS

This application is a divisional of application Ser. No. 07/963,797 filed Oct. 20, 1992, now U.S. Pat. No. 5,358, 398, which is a continuation-in-part of application Ser. No. 07/877,349 filed Apr. 30, 1992, which is a continuation of application Ser. No. 07/621,675 filed Nov. 30, 1990, now abandoned.

TECHNICAL FIELD

The present invention relates to a method and apparatus for separating a mold to remove a molded article, and more particularly to a method and apparatus for continuously separating and processing molds during molding of articles in a continuous molding system.

BACKGROUND OF THE INVENTION

A variety of continuous injection molding systems are currently available for manufacturing articles using materials cured under the control of heat and pressure. In the past, single or multiple cavity, divided molds were typically used in such systems. The molds were generally pre-heated to a desired temperature, and material was then injected into the molds. The molds were first clamped or compressed, and then injected with molding material using, for example, an injection press, and cured under pressure.

The production rate of injection molded articles in systems of the type mentioned above has been increased using a variety of conveyors to transport the molds between injection, compression and heating stations. A variety of devices have also been used for removing the articles from their molds once the curing process is completed. Unfortunately, such devices have not provided the flexibility necessary to accommodate the speed achieved in different stages of system operation.

SUMMARY OF THE INVENTION

The present invention provides a new and improved method and apparatus for separating multi-section molds and removing molded articles manufactured in a continuous molding system. The present invention provides a mold separator-assembler apparatus which separates a mold, and increases the time allowed for each individual function needed to be performed during removal of a molded article from a system mold and preparation of the mold for the next injection operation. The increase in time is accomplished by parallel processing of the mold sections of each mold. The separator-assembler apparatus then reassembles the mold for further injection molding operations.

The continuous molding system is a nonsynchronous system wherein a multi-section, self-clamping mold is injected with molding material by a material injector. A transfer system is then used to transport the mold to a curing apparatus for curing the article. Once the molded article is cured, the mold is transported by the transfer system to the mold separator-assembler apparatus of the present invention wherein the mold is unclamped, and disassembled into its sections, so that the finished molded article may be removed from a mold section. The empty mold sections are then pre-treated, assembled and clamped for transport from the mold separator-assembler apparatus by the transfer system to a position for production of additional molded articles. A controller system choreographs operation of the injection system for injection of the molding material into the molds, and the proper timed movement of the molds by the transfer system through the material injector, curing apparatus and mold separator-assembler apparatus to ensure the proper curing of the articles to be molded.

In accordance with the preferred method and apparatus of the present invention, the material to be cured is a high grade compound molding material. The self-clamping, pre-loaded mold is preferably a single cavity mold having two or more sections. However, molds having different internal configurations may be used within the system, and molds having one or more cavities and/or sections may also be used, to enable the concurrent molding of different parts. The mold includes a clamping device for securing the sections in pre-loaded condition, in which the sections are arranged in stacked or parallel planar relationship. In the clamped or pre-loaded condition, the mold is under pressure, without the use of an external press or other clamping or loading force.

Prior to injection of material into the mold, the mold is preferably pre-treated with any necessary mold coatings, heated to a desired temperature to assist with curing of the material, or provided with any inserts or other internal elements to be included within the article to be molded. Upon completion of the pre-treatment process, the mold is assembled and the self-clamping device is engaged to clamp sections of the mold together under a force of between zero and 6000 pounds, but preferably approximately 6000 pounds. The mold is then moved into position for the injection of the molding material.

An injection system having a material injector with an injection head is preferably used for injecting the molding material into the clamped mold. Once injection of the molding material is completed, and curing of the molding material within the mold is initiated, the self-clamping mold is removed from the injection system, and preferably moved into communication with a transfer system.

The transfer system transports the mold to a curing apparatus. In the preferred construction of the present invention, the curing apparatus includes a curing oven, through which the molds are transported by the transfer system. The curing process is, however, intended to include a process which changes the physical form of the material, e.g. conventional vulcanization and melting and solidification as in thermoplastic crystallization. The transfer system transports the mold through the curing oven at a rate sufficient to complete curing of the molded article when the mold exits the curing oven. Where different molds are used containing different molded articles, the controller system ensures that movement of the different molds and articles via the transfer system, for example, through the curing apparatus, is properly timed for curing of the articles to be molded. Such curing apparatus may include, but is not limited to, induction, conduction, radiation and the like.

By combining the use of a high grade of molding material, a self-clamping mold to maintain the molding material under pressure without using the pressure applied by the injection head during the injection of material into the mold, and a curing apparatus, the method and apparatus of the present invention reduce the overall time required to process each molded article, eliminates flash formation on the molded articles, and compensates for the shrinkage of the molding material during the curing process. Additionally, the molded articles produced using the present system have physical properties substantially equal to those of the prior compression or injection molded articles.

Once the molded article is cured, the transfer system transports the mold to a mold separator-assembler apparatus, for removal of the molded article, and pre-treatment of the mold for the next molding process. The mold separator-assembler apparatus releases the clamping device of the mold. The mold is then moved to a disassembly station where the mold is disassembled into its respective sections. Once separated, the mold sections are preferably moved between work stations or positions of the separator-assembler apparatus in co-planar relationship. At a first work station, the molded article is removed from one of the mold sections. At successive work stations, the mold sections are cleaned, inspected and pre-treated for the next molding process. As discussed, pre-treatment may include steps such as coating the interior of the mold or loading the mold with elements to be formed in the articles to be molded, e.g. metal inserts for bushings. The mold sections are next moved to a reassembly station, where the mold separator-assembler reassembles the mold sections in adjacent, parallel planar relationship. The molds are then moved to a clamping station where they are secured in clamped condition using the clamping device. Using the transfer system, the mold is then transported to the injector system for injection molding of the next article.

Other features and advantages of the present invention will become apparent from the following detailed description of preferred embodiments made with reference to the accompanying drawings, which form a part of the specification.

BRIEF DESCRIPTION OF THE DRAWINGS

FIGS. 4 and 5 are front and side views, respectively, of an upper alignment member;

FIGS. 6 and 7 are front and side views, respectively, of a lower alignment member;

DETAILED DESCRIPTION OF THE PREFERRED EMBODIMENTS

Figure 1A:
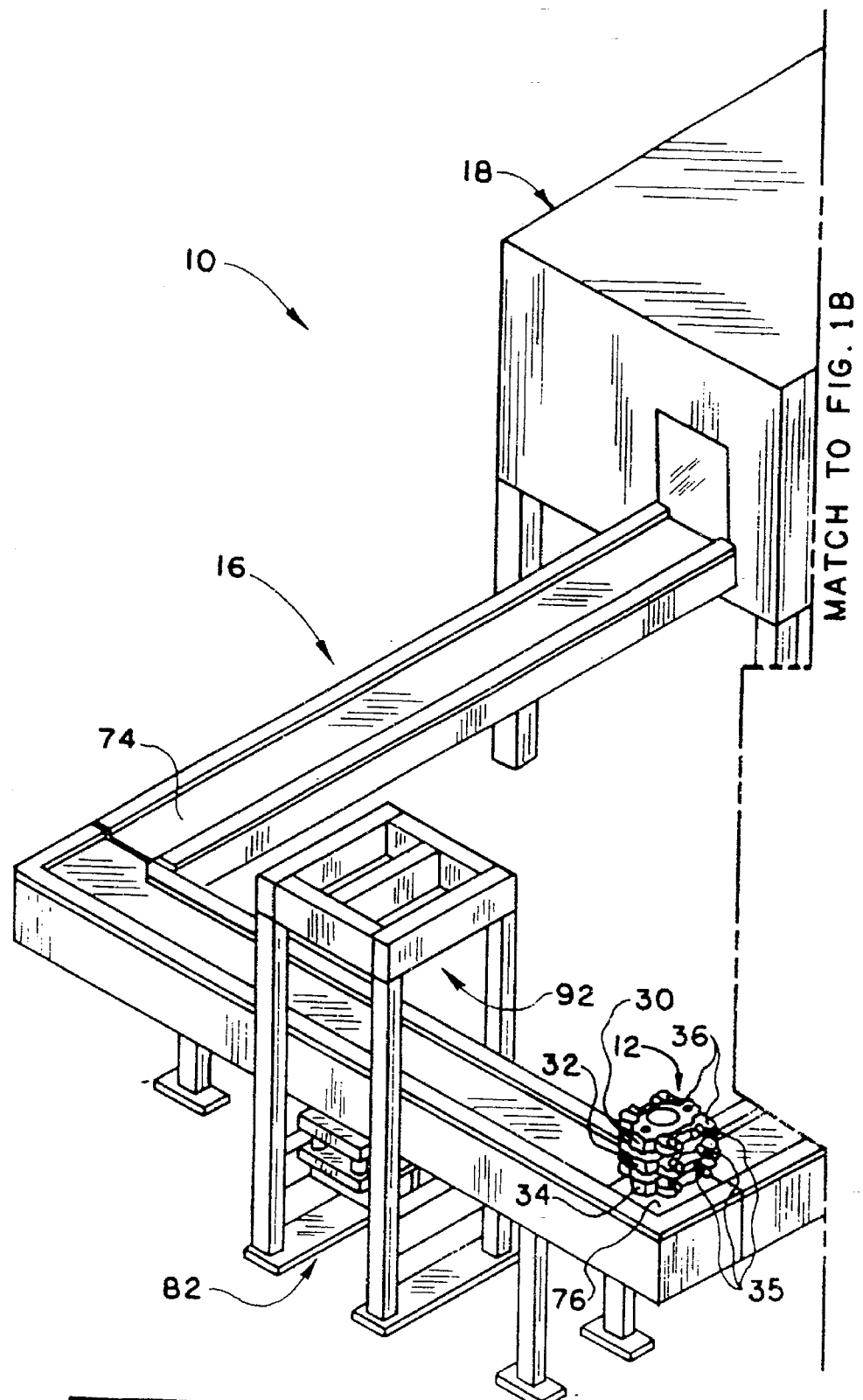
FIGS. 1A–1C are a schematic, perspective view of a system for continuous molding of articles.
Figure 1B:
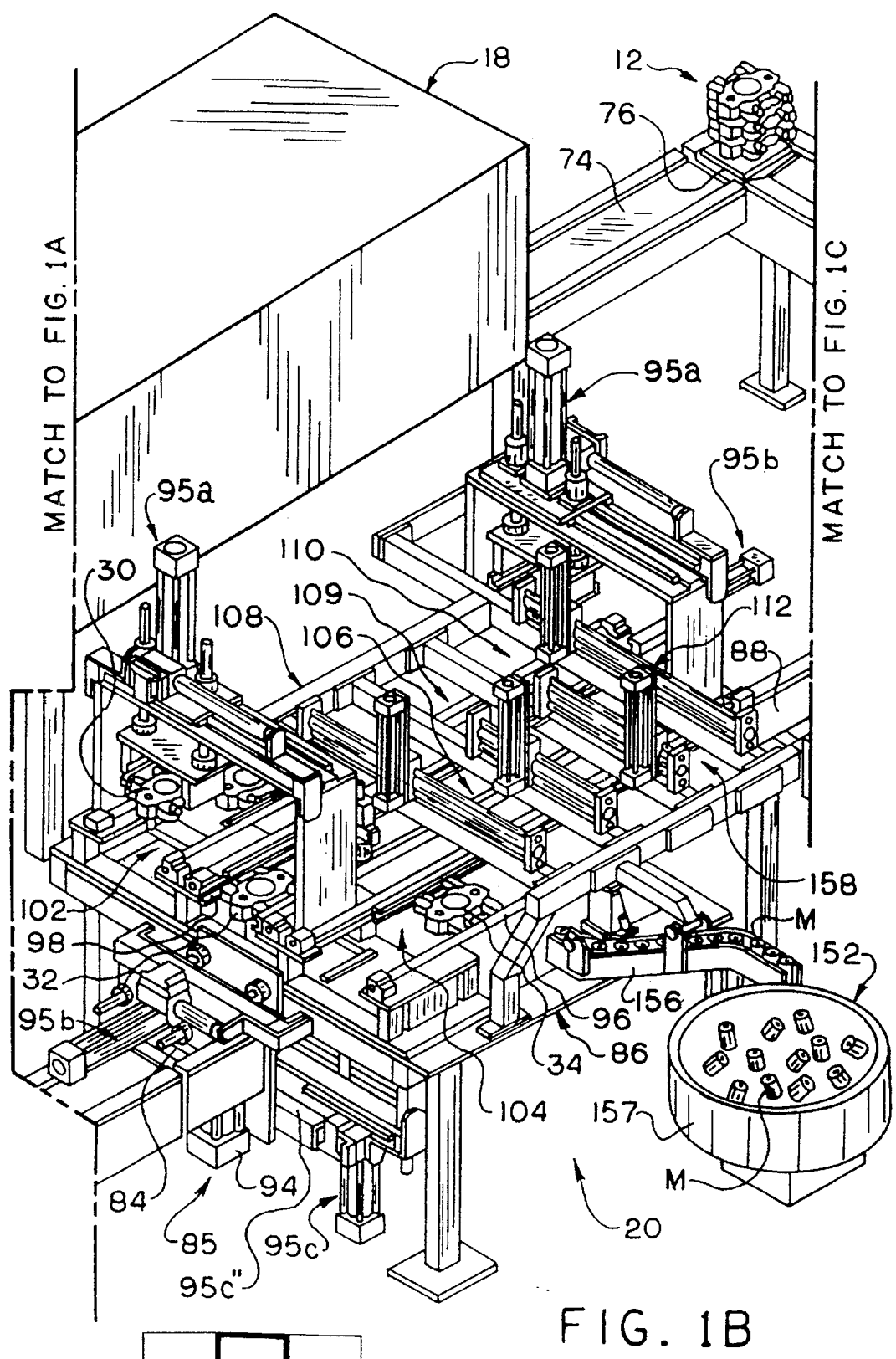
Figure 1C:
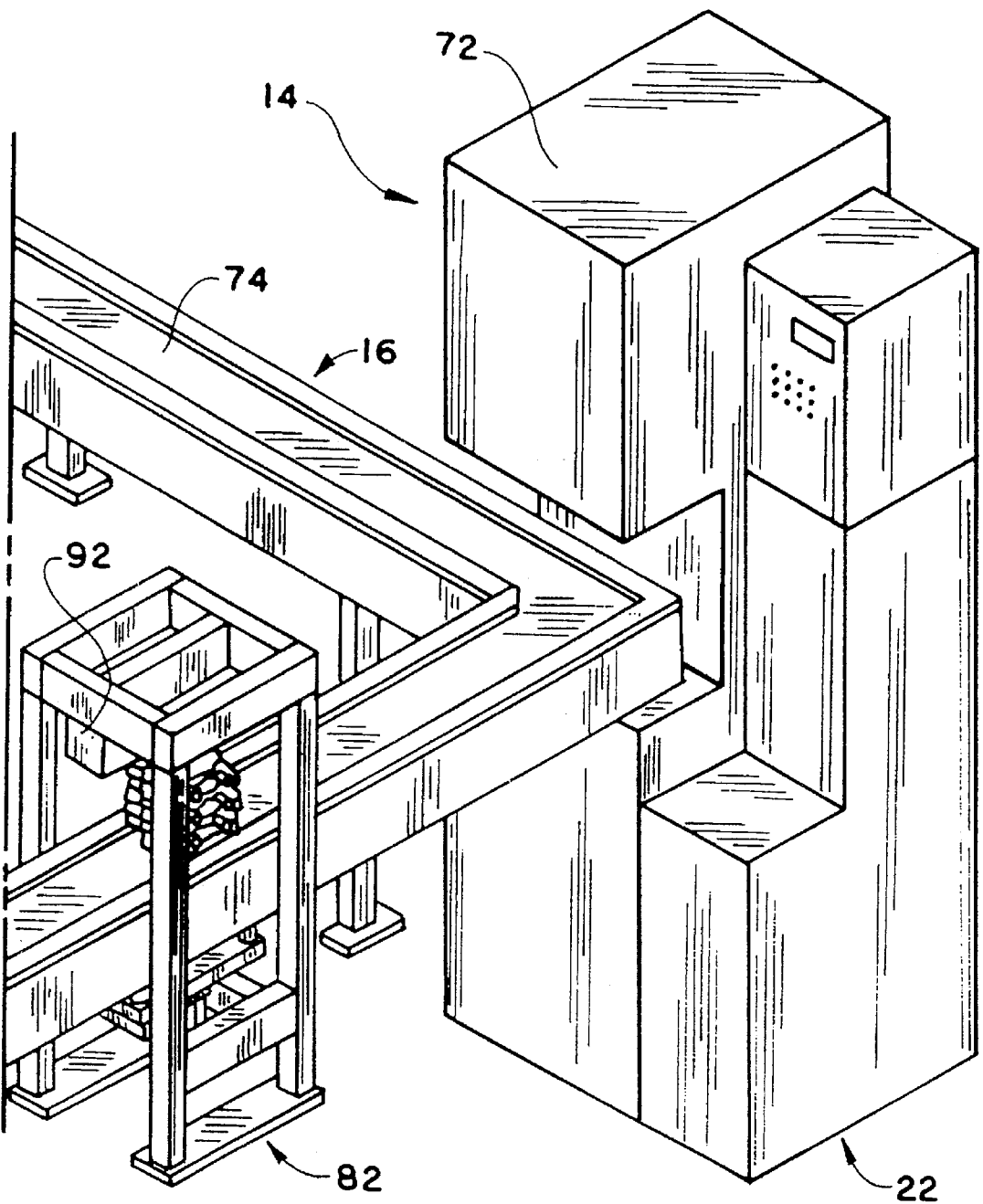

FIGS. 1A, 1B and 1C schematically illustrate a system 10 for continuously and nonsynchronously molding articles from a material cured by heat and pressure. The system uses multi-section, self-clamping molds 12 which are injected with molding material by a material injector 14, and then transported by a transfer system 16 to a curing apparatus 18 for curing the article to be molded. After the article is cured, the mold 12 is transported by the transfer system 16 to the mold separator-assembler apparatus 20 of the present invention where the mold is disassembled, the molded article removed, and the mold sections are treated and reassembled for the next molding operation. The timing of injection of the mold, and movement of the mold through the curing apparatus 18 and mold separator-assembler apparatus 20, is controlled by a controller system 22.

As illustrated in the preferred embodiment of the system in FIGS. 1A–1C, multi-section, self-clamping, pre-loaded molds are used. The molds 12 preferably have a single cavity, and include three sections: a top section 30, a middle section 32, and a bottom section 34. Details concerning the self-clamping mold are set forth in copending application Ser. Nos. 07/877,349 and 07/751,015, now U.S. Pat. No. 5,256,056, which are incorporated herein by reference. Each mold also includes a pallet 76 for supporting the mold 12 during movement within the transfer system.

Prior to clamping of the mold 12 to the pre-loaded condition, the mold is preferably pre-treated: a) by coating the mold cavity with any necessary coatings to enable the article to be molded to be readily removable from the mold cavity; and b) by including additional inserts or other internal elements to be formed within the article to be molded. Upon completion of the pre-treatment process, the mold 12 may be fully assembled and a self-clamping device engaged to clamp the sections of the mold.

Once the mold 12 is pre-treated, assembled and clamped, typically under a force of approximately 6000 pounds, the mold is ready for injection of the molding material. The molding material used in the preferred embodiment of the present invention, is a high grade compound material which upon curing obtains characteristics of high fatigue, heat resistance, and other desirable characteristics.

The controller system 22 includes a programmable logic controller. The logic controller of provides individual control of each mold 12, including operation of the injection system 14, transfer system 16, curing apparatus 18, and mold separator-assembler apparatus 20. Operation of the controller system 22 is preferably automatic, however, the controller system may be in part manually operated by a skilled operator to manipulate system operations or movement of the molds 12 as desired.

The injection system 14 preferably includes an injection press 72. As schematically illustrated in FIG. 1C, the injection press 72 is a single station press. Once injection of the molding material is completed, the injection head is removed from the mold, and the mold is removed from the injection press by the transfer system 16.

The controller system 22 nonsynchronously moves the mold 12 from the injection system 14, to the curing apparatus 18 via the transfer system 16, which is a conveyor 74.

As shown schematically in FIGS. 1A and 1B, the curing apparatus 18 comprises a conventional curing oven. Although the conventional curing oven uses temperature to provide material curing, alternative curing methods, such as induction, are also possible. The molds 12 are preferably moved via the transfer system 16 through the curing oven 18 at a rate resulting in complete curing of the article to be molded once the mold exits the curing oven.

Once curing is completed, the mold 12 is removed from the curing oven 18 on the conveyor 74. The mold 12, together with the cured article being molded, is transferred to the mold separator-assembler apparatus 20 via the conveyor 74, and under control of the controller system 22. The mold 12 is provided to the mold separator-assembler apparatus 20 for removal of the molded article, and pre-treatment of the mold for the next molding process.

The preferred embodiment of the mold separator-assembler apparatus 20, illustrated in FIGS. 1A–1C, provides parallel processing of the individual molds and their sections. The mold separator-assembler apparatus 20 includes mold latch mechanisms 82, a receiving station 84, mold elevators 85, a conveyor table 86, an intermediate mechanism 150, a material handling mechanism 152 and an exiting station 88.

Figure 2A:
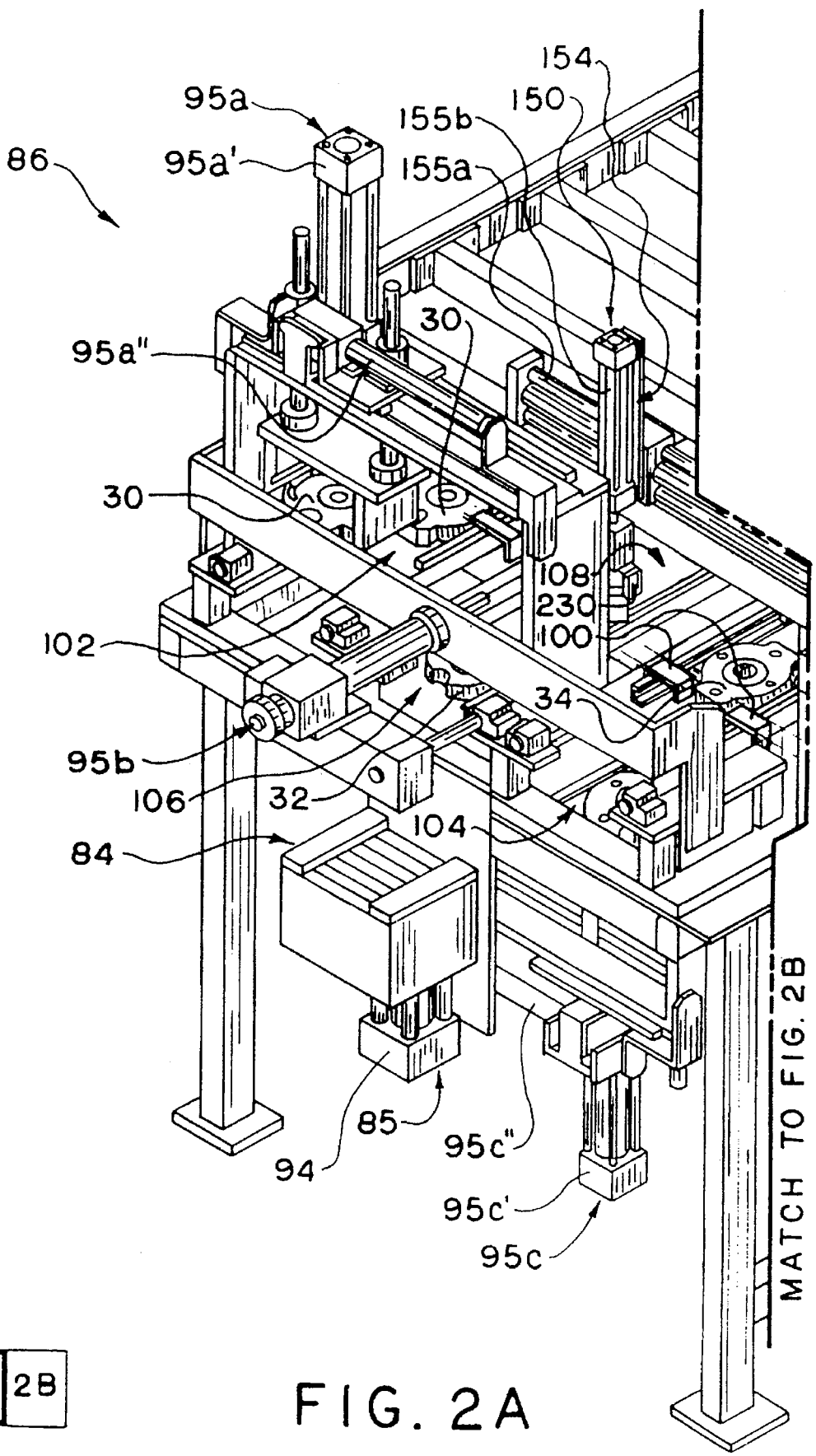
FIGS. 2A and 2B are schematic, partial perspective views of apparatus used to separate and assemble molds in accordance with the present invention.
Figure 2B:
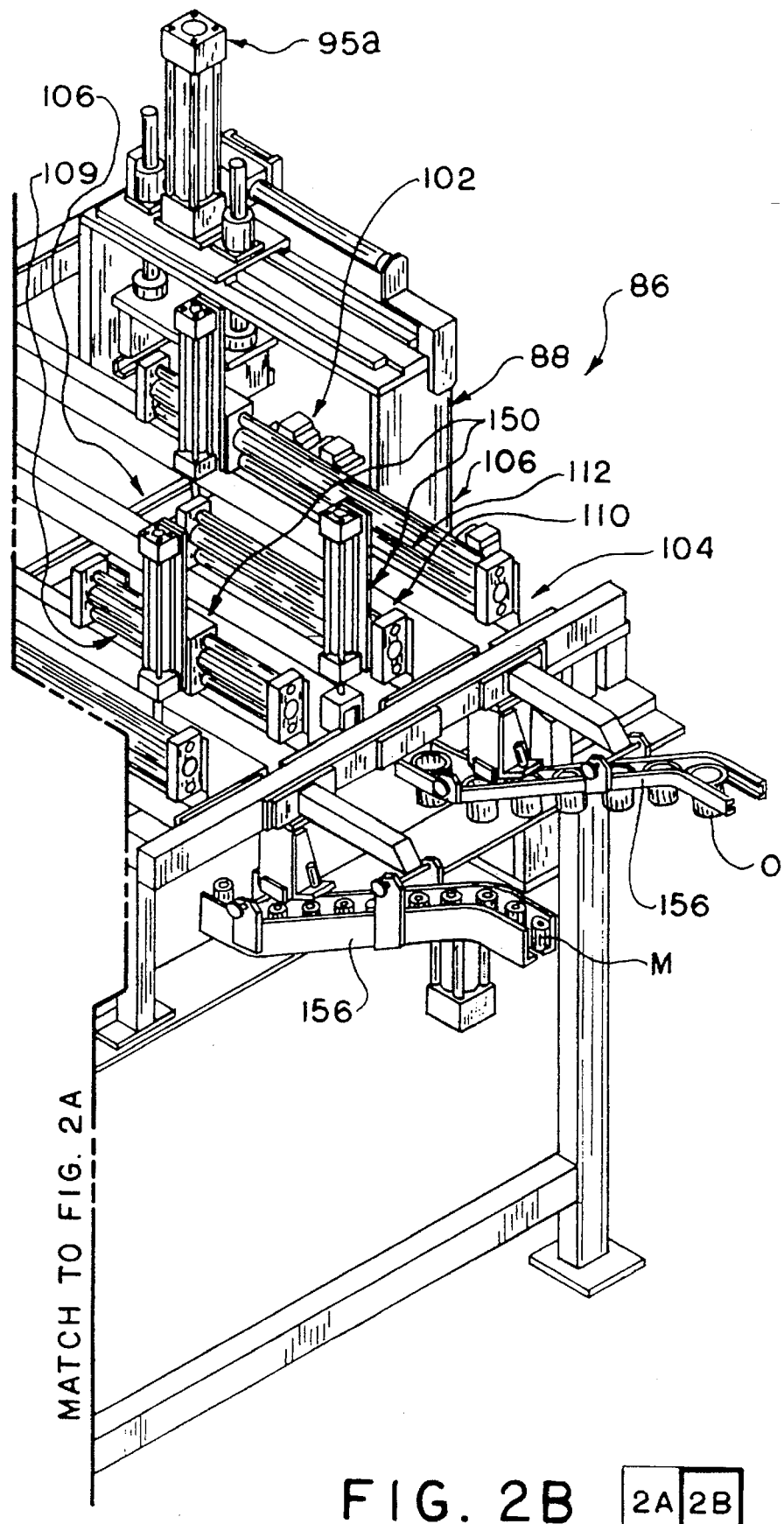

The conveyor table 86 is also illustrated in FIGS. 2A–2B. Prior to entering the conveyor table 86 of the mold separator-assembler apparatus 20, the mold 12 is conveyed to a first mold latch mechanism 82, positioned along the conveyor 74 before the receiving station 84 and conveyor table 86. The mold latch mechanisms 82 include a pneumatic cylinder which operates to release the self-clamping device of the mold 12 using a rotating device 92 for engaging and rotating the mold self-clamping device.

Once the clamping device of the mold 12 is disengaged by the first mold latch mechanism 82, the mold is moved by the conveyor 74 to the receiving station 84 of the mold separator-assembler apparatus 20. At the receiving station 84, the sections 30, 32, 34 of the mold 12 are supported on a mold elevator 85, having a pneumatic cylinder for movement of the mold elevator into engagement within the conveyor table 86. Specifically, the mold elevator 85 includes a pneumatic cylinder actuator 94 for providing vertical movement of the mold sections. Additionally, pneumatic actuators 95a, 95b, 95c positioned above, at the level of, and below the conveyor table 86, respectively, are also provided for horizontal movement of the mold sections. Each of the individual pneumatic actuators 95a, 95b, 95c includes a pneumatic cylinder and may additionally include other pneumatically operated equipment, as schematically illustrated, to provide operating movement of the actuators. In the preferred embodiment, the pneumatic actuators 95a, 95c include, for example, conventional rodless cylinders 95a', 95c', and conventional air cylinders 95a", 95c". These cylinders are manufactured by SMC Pneumatics, Inc. of Indianapolis, Ind. The application and operation of such cylinders and equipment are conventional, and thus are not further discussed in detail.

During movement and disassembly of the mold into sections, and the positioning of each mold section within the conveyor table 86, the assembled and unlatched sections 30, 32, 34 of the mold 12 are first moved via the conveyor onto the mold elevator 85 and vertically raised by the cylinder 94 of the mold elevator 85 to a position in approximately the same plane as the conveyor table 86. The mold sections are then pushed by the actuator 95b, or position mover, from the receiving station 84 and raised mold elevator 85 to a position such that the middle section 32 of the mold is supported within the track of the conveyor table 86 for mold middle sections, generally referenced at 106. In this position, shown in FIGS. 3A–3B, the top section 30 engages a horizontally and vertically movable upper carriage assembly 200. The bottom mold section 34 engages a horizontally and vertically movable lower carriage assembly 220. The upper and lower carriage assemblies are interconnected with the upper and lower actuators 95a, 95c , respectively.

Figure 3A:
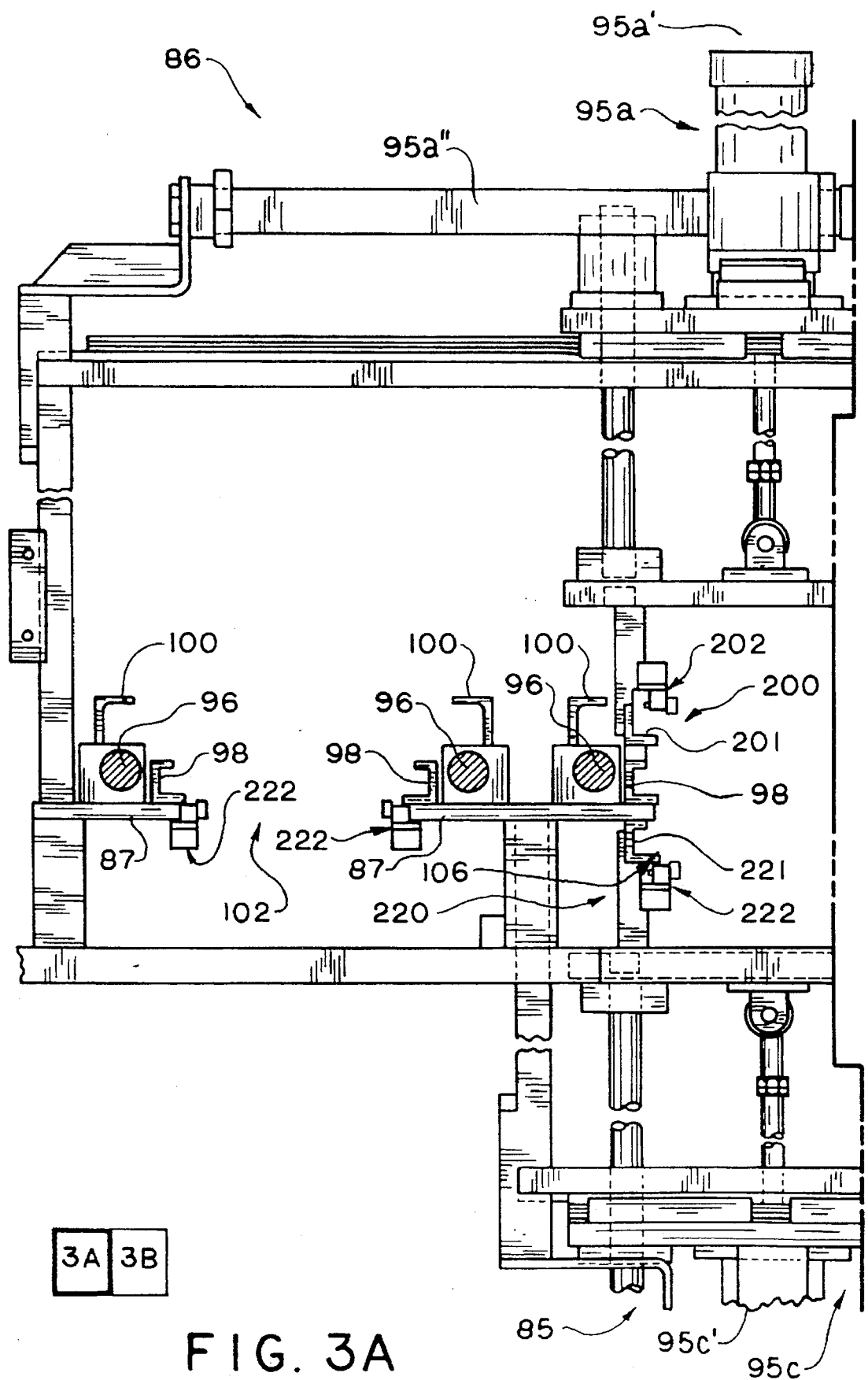
FIGS. 3A and 3B are schematic, sectional end views of the apparatus shown in FIGS. 2A and 2B.
Figure 3B:
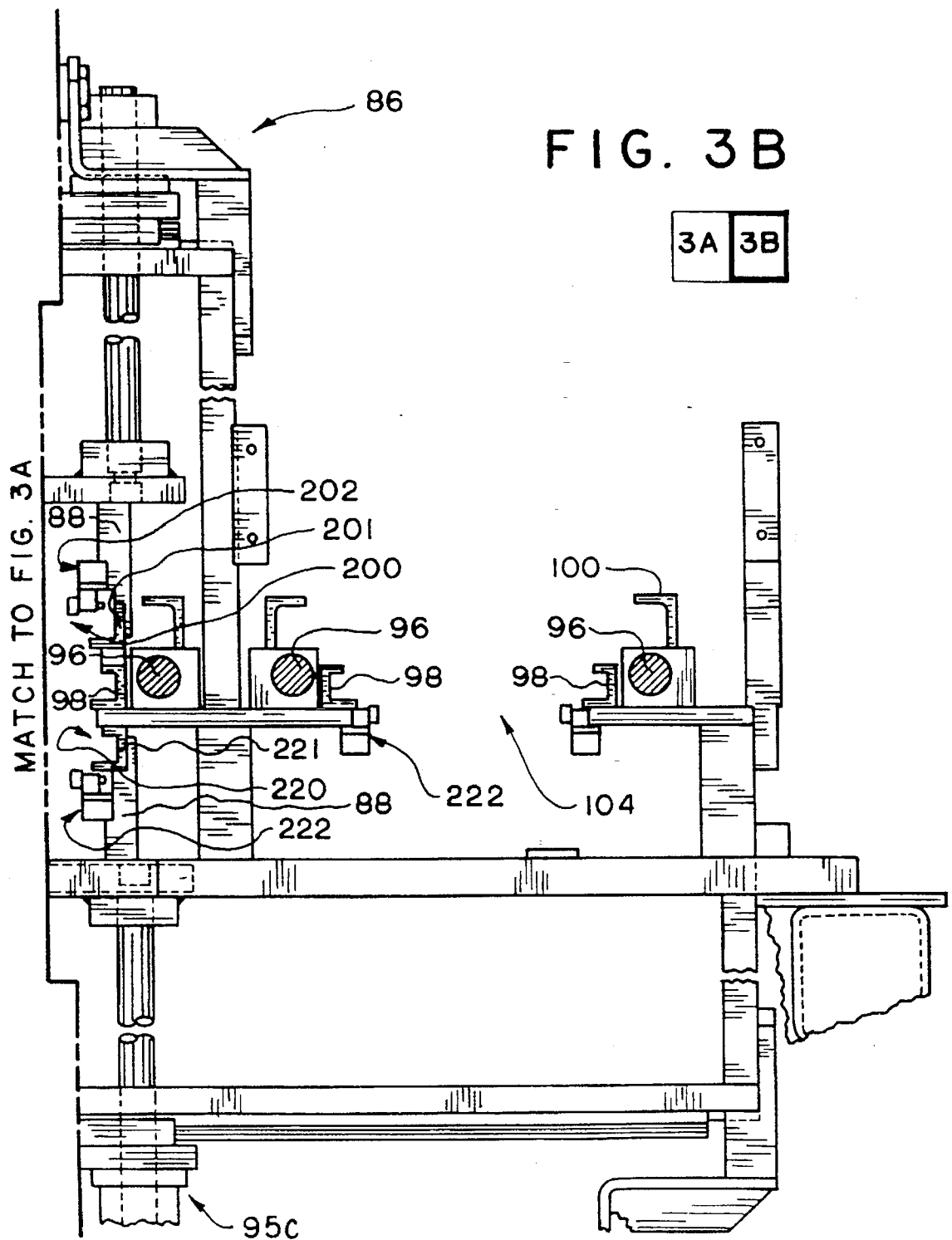
Figure 3C:
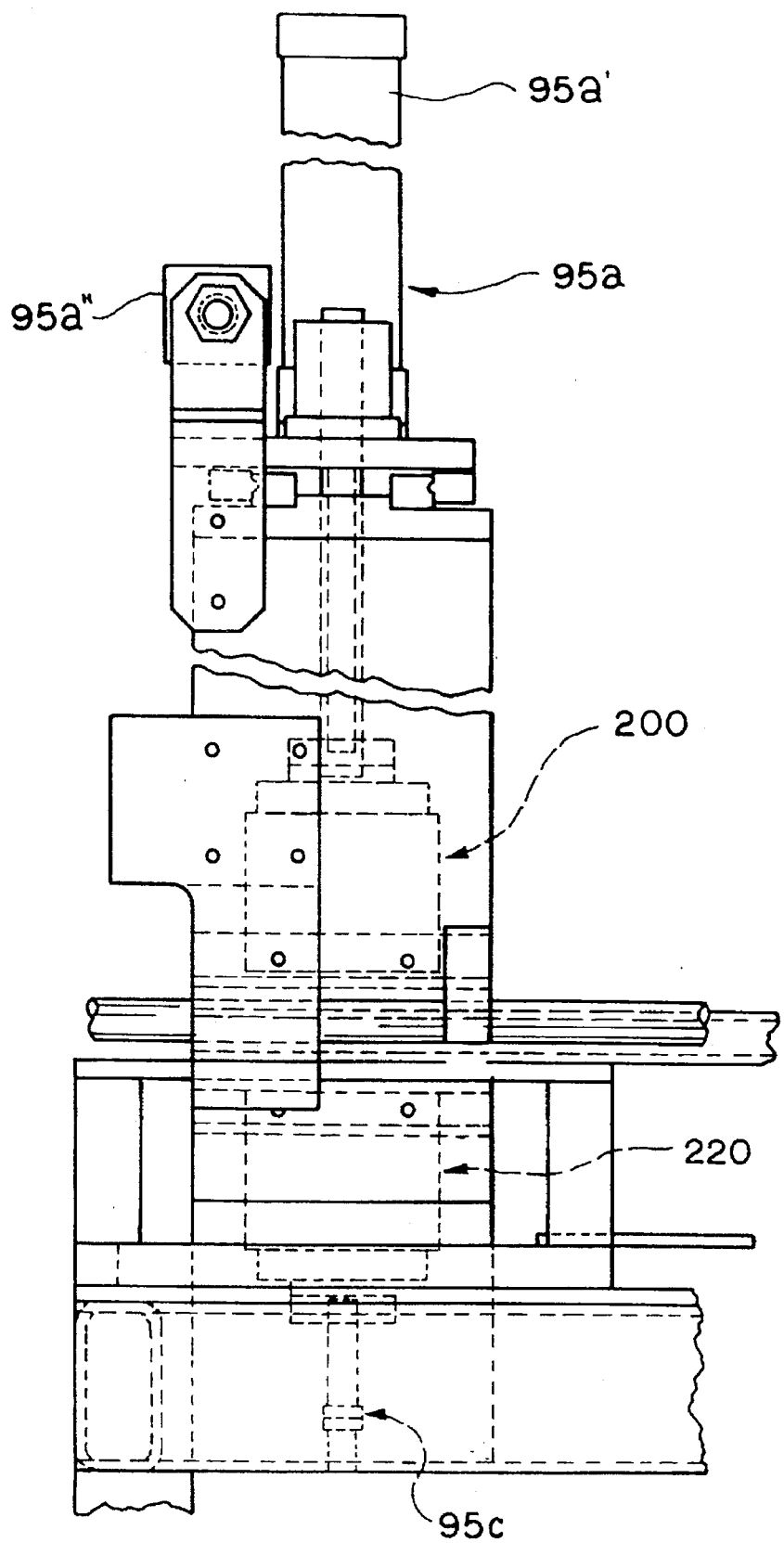
FIG. 3C is a schematic, sectional side view of the apparatus shown in FIG. 2A.

Each of the carriage assemblies 200, 220 includes opposite support members, indicated in the upper assembly at reference number 201 and in the lower assembly at reference number 221. Additionally, upper and lower alignment members 202 and 222 are also provided, and are positioned as shown in FIGS. 3A and 3B. The upper alignment member 200 is illustrated in further detail in FIGS. 4 and 5. The lower alignment member 220 is illustrated in further detail in FIGS. 6 and 7. Further description of the alignment members 200, 220 is set forth below. It should be understood to one of ordinary skill in the art that the carriage assemblies are pneumatically actuated to first engage their respective mold sections, and once engaged to move them to their desired positions within the table 86.

From the position shown in FIGS. 3A–3B, the top section 30 of the mold 12 is then raised vertically, and horizontally moved to the position shown in FIG. 1B, whereupon the mold section is vertically lowered by the actuator 95a, positioned above the conveyor table, into engagement with a track of the conveyor table 86 for mold top sections 30, generally referenced at 102. Also from the FIG. 3A–3B position, the actuator 95c positioned below the conveyor table 86, moves the bottom section 34 vertically downward and horizontally, and finally vertically upward to a track of the conveyor table 86 for mold bottom sections 34, generally referenced at 104.

Prior to any movement of the top and bottom mold sections 30, 34 by the upper and lower actuators 95a, 95c, mold wheels 35 of the middle mold section 32 are supported on, and captured between, opposite, parallel C-shaped flanges 98, shown in FIGS. 3A and 3B, which form the middle track 106 of the conveyor table. Additional pairs of opposite, parallel flanges 98 form the top mold section track 102 and bottom mold section track 104 of the conveyor table 86. Adjacent the opposite flanges 98 forming each of the tracks art positioned pneumatically controlled rotatable shafts 96 having L-shaped flanges 100 secured thereto. The top and bottom sections 30, 34 of the mold 12 are positioned in their respective tracks 102, 104, upon horizontal movement by the rodless cylinders 95a", 95c" of the upper and lower actuators 95a , 95c. Upon arrival at their respective tracks, the top and bottom mold sections 30, 34, are released from engagement with the upper and lower carriage assemblies 200, 220.

To move the mold sections 30, 32, 34, along their respective tracks 102, 106, 104, track movers or the L-shaped flanges 100, are rotated to engage slot portions 36 formed in each of the mold sections to secure the mold sections within the C-shaped flanges 98. Upon rotation of the shafts 96 under control of the controller system 22, the L-shaped flanges 100 rotate into engagement with the slot portions 36, thereby capturing mold wheels 35 on each mold section within the C-shaped flanges 98 forming the tracks. Horizontal pneumatically controlled movement of the rotatable shafts 96 is then used to move the mold sections 30, 32, 34 along their respective tracks on the conveyor table 86 to the work stations.

The tracks 102, 104 are additionally provided with lower alignment members 222 of the type used in connection with the lower carriage assembly 220. As the alignment members 202, 222 of the upper and lower carriage assemblies 200, 220 are opposite in orientation but otherwise substantially similar, common elements will be referred to using the same reference numerals. Likewise, since the lower carriage assembly alignment members 222 are identical to the alignment members used in tracks 102 and 104, only the differences between the devices will be pointed out in further detail.

The upper alignment members 202, shown in FIGS. 4 and 5, and the lower alignment members 222, shown in FIGS. 6 and 7, are used to properly position each mold section within its proper position or station. In the illustrated examples of FIGS. 4 and 6, a grooved cam portion 159 of a mold section 30, 32, 34 is engaged with the alignment member 202 and 222. The alignment members 202, 222 of the upper and lower carriage assemblies are secured by conventional fasteners adjacent the support members 201, 221, to a support surface 88 which forms a part of each assembly. Likewise, the alignment members 222, shown in FIGS. 3A, 3B, positioned along each station of the top mold section and bottom mold section tracks 102, 106 are secured to a support surface 87 of the conveyor table 86 adjacent the C-shaped flanges 98. The alignment members are positioned at each of the work stations for engagement with grooved cam portions 159 provided in each mold section. In this engaged position, the alignment members 222 operate to position the moving mold sections within their work stations along their respective tracks.

The alignment members 202, 222 include a leaf spring portion 162 which is surrounded and engaged between spring support members 161 which are secured by conventional fasteners along the support surfaces 88 or 87 of the carriage assembly 220 or conveyor table 86, respectively. The leaf spring portion 162 supports a wheel 163 which is positioned to engage the grooved cam portions 159 of the respective mold section 30, 32, 34. When the wheel 163 of the alignment member 202, 222 is engaged with the cam portion 159 of the mold section, the mold section is properly positioned within the carriage assembly or located at a work station. Once the mold sections are within their respective tracks, continued movement of the mold section along the track in the direction of the arrow generally referenced at P, moves the grooved cam portion 159 along the wheel 163 and out of engagement with the alignment member, until the grooved cam portion 159 is engaged with a wheel 163 of an alignment member 222 at the next successive work station. The embodiment of the alignment member 222 illustrated in FIGS. 6–7 is for engagement with each of the downwardly directed cam portions 159 of the mold sections 30, 32, 34.

Figure 8:
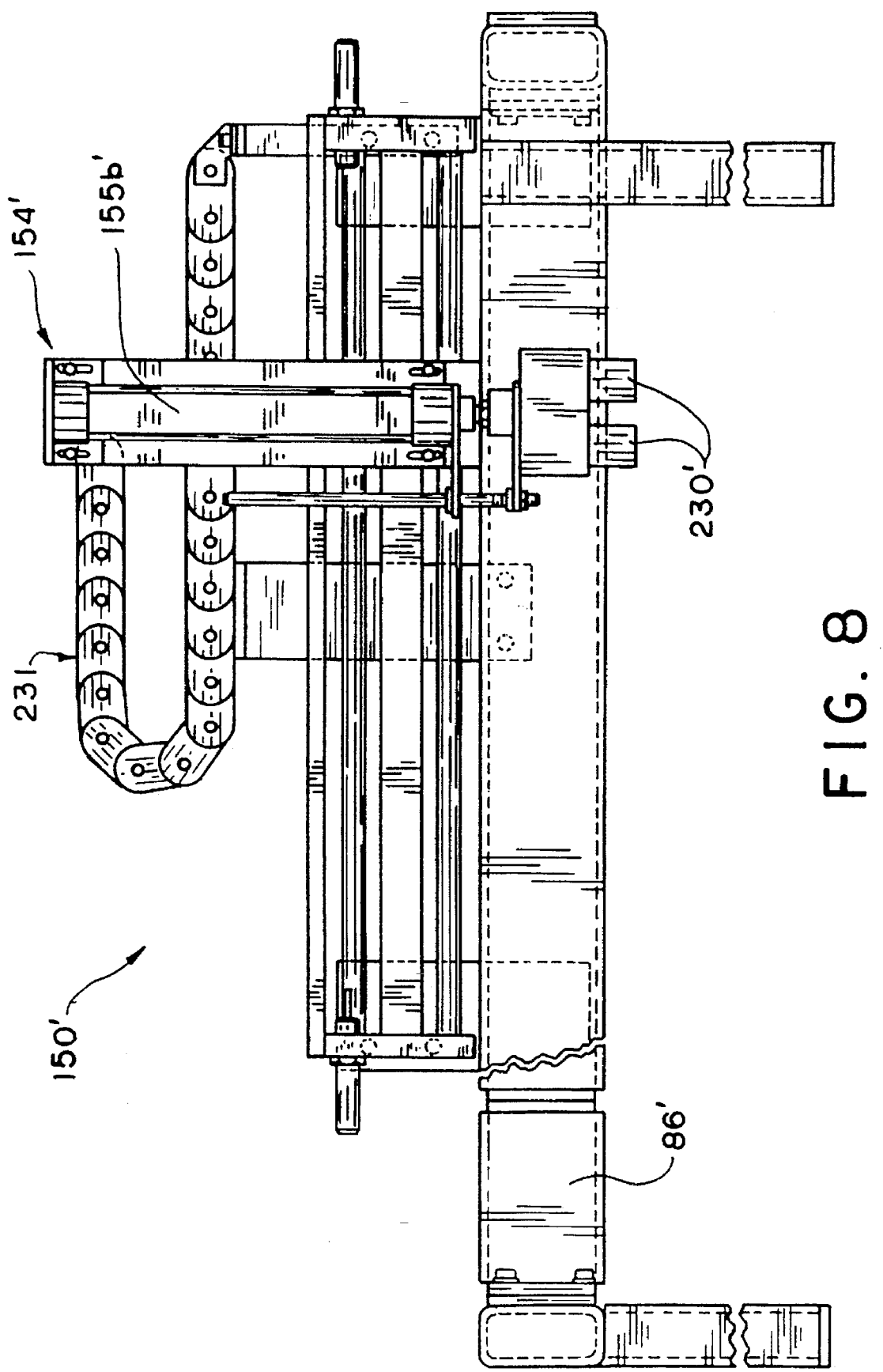
FIG. 8 is an alternate embodiment of an intermediate mechanism of the present invention.

Once the mold sections are separated, add positioned in their respective mold section tracks along the conveyor table 86, the sections are horizontally moved in their parallel relationship between work stations within the flanges 98 under pneumatic control of the rotatable shafts 96 and L-shaped flanges 100. Movement of the mold sections between work stations along the conveyor table 86 is in parallel, co-planar relationship. At a first work station 108, the molded article is removed from, for example, the middle mold sections 32. Removal of the molded articles may be an operator, or by an intermediate mechanism 150, as illustrated in FIG. 1B and 2A. The intermediate mechanism 150 is illustrated as a pneumatic actuator 154, including a rodless cylinder 155a for providing horizontal movement and an air cylinder 155b for providing vertical movement. Under direction of the controller 22, the actuator of the intermediate mechanism 150 includes a gripper 230 which is capable of grasping the molded article and vertically moving and depositing it in a material handling device. The handling device may be a conventional conveyor system, or simply a supply container provided adjacent the conveyor table and intermediate mechanism. An additional pneumatic actuator may alternatively be used either alone, or in combination with other devices, to assist with vertical and horizontal movement of the molded article to the conveyor system and/or supply container. An alternate embodiment of an intermediate mechanism 150' for removing articles from the mold sections or inserting articles into the mold sections is illustrated in FIG. 8. The mechanism 150' is a rate plate device 231 which provides horizontal movement of the gripper 230' for engaging the article to be moved, and an air cylinder 155b' for vertically moving and actuating the gripper. It should be understood, that additional conveyor devices, pneumatic actuators and/or intermediate mechanisms, as shown in FIG. 1B and 8, may also be provided at any or all of the work stations, either to supply additional materials to the molds within the conveyor table, or to remove materials from the molds.

At a second work station 109, the mold sections are cleaned, inspected and may be pre-treated in advance of the next molding process. It should be understood that each of the mold sections positioned in their respective tracks move simultaneously and horizontally to the next work station. At a third work station 110, the mold sections are provided with still further pre-treatment processing. In the preferred embodiment of the present invention, the pre-treatment includes coating the interior of the mold inserts and/or loading the mold with inserts, which are elements to be formed in the articles to be molded. For example, in the illustrated embodiment of FIG. 2B, wherein the system 10 manufactures vehicle bushings, inner and outer metal inserts are used within the mold and are formed in the molded bushing article. At the second work station 109, inner metal inserts M are supplied from a supply device 152, as in FIG. 1B, to a supply channel 156. The supply device illustrated in FIG. 1B is a conventional supply container 157, the inserts M may be supplied by a conveyor system or any conventional supply mechanism. The supply channel provides the inserts M directly to the work station 108, whereupon the intermediate mechanism 150 grasps the insert via the grippers, and moves the insert vertically and horizontally to the desired mold section as instructed by the controller 22.

In the embodiment of FIG. 2B, upon movement to the third work station 110, additional outer metal inserts O to be formed in the bushing article to be molded are supplied via the supply channel 156 to the work station 110, and are then placed within the desired mold section by an intermediate mechanism 150 as described above. As discussed above, the steps performed at the work stations of the mold separator-assembler apparatus 20 may be accomplished manually, or mechanically using conventional pneumatic equipment in the form of the "pick and place" equipment illustrated in FIGS. 1A–C and 2A–2B. Alternatively, robotics techniques could also be used.

Finally, the mold sections are moved to a reassembly station 112 on the conveyor table 86 of the mold separator-assembler apparatus 20. From the reassembly station 112, the mold separator-assembler apparatus 20 reassembles the mold sections 30, 32, 34 to their original adjacent, parallel planar relationship in the middle track 106 of the conveyor table 86. The reassembly process is performed pursuant to steps opposite from those described in connection with the separation of the mold sections, and uses the actuator 95b to position the sections of the mold 12 on the mold elevator 85 using actuator 94.

The reassembly process is performed in reverse of the process previously described in connection with disassembly of the mold, and thus only portions of the process not previously discussed are provided. The top and bottom mold sections 30, 34 are moved vertically and horizontally by actuators 95a, 95c into a position identical to that illustrated in FIGS. 3A–3B, but adjacent the final work station 112. Once in stacked relationship positioned in the center track 106, the mold 12 is ready for removal from the table 86 to the exiting station 88. The exiting station 88 is positioned at an opposite end of the table 86 from the receiving station 84 where the mold was initially provided to the separator-assembler apparatus 20.

Figure 9:
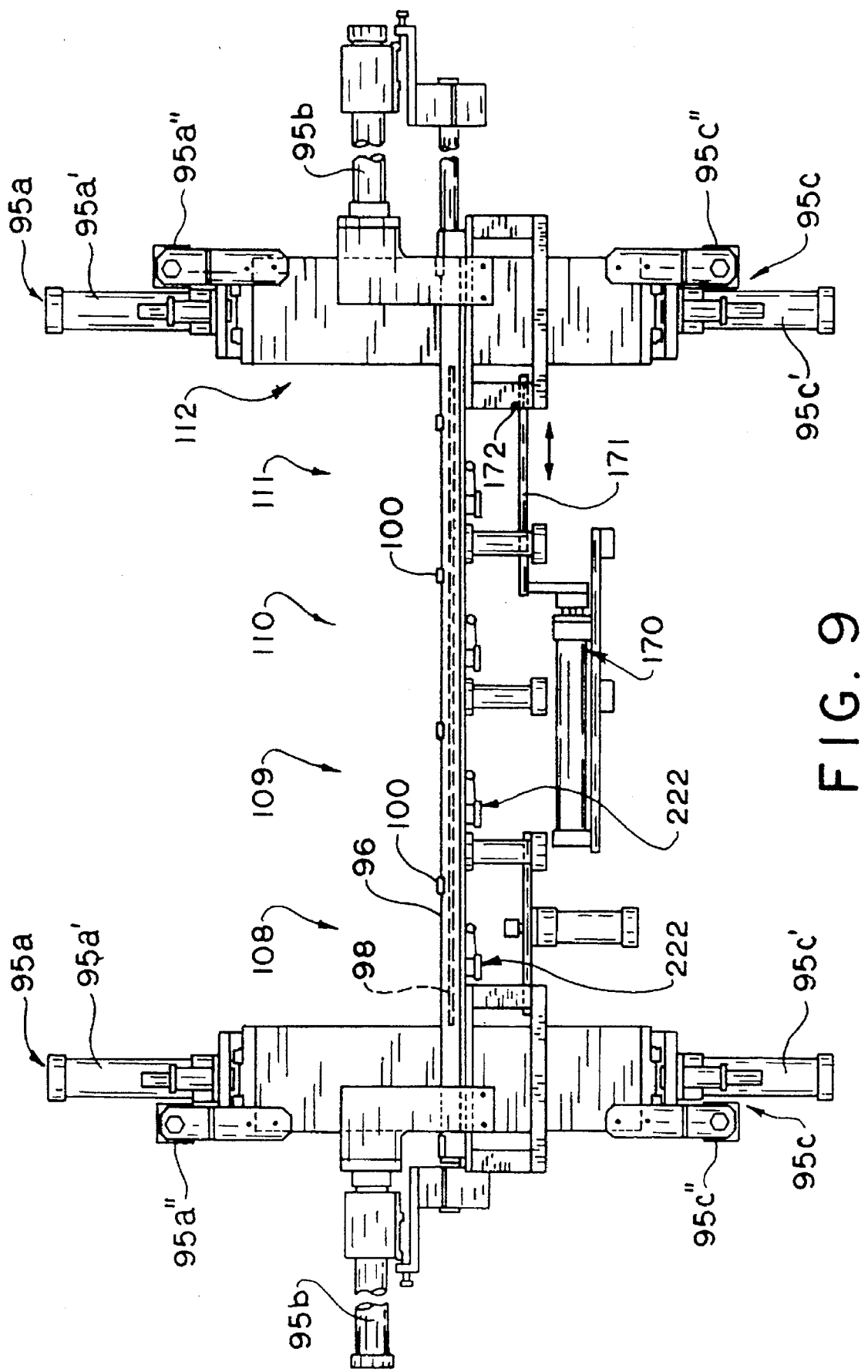
FIG. 9 is a schematic, partial side view of a portion of the separator-assembler apparatus used to discharge a mold to the transfer system.

The actuator 95b used to remove the mold to the exiting station 88 and elevator 85 includes a pusher 170, or position mover, of the type schematically illustrated in FIG. 9. The pusher 170 engages the bottom mold section 34 and moves the section from the table 86 to the exiting station 88. The pusher 170 of FIG. 9 includes a horizontally movable shaft 171 which pushes the mold 12 onto the mold elevator 85, and a rotatable hook member 172 which engages and disengages the slot portions 36 as desired, and under direction of the controller 22.

Once the mold is pushed onto the exiting station 88 and elevator, the mold elevator 85 is then vertically lowered using the actuator 94. The mold is transported via the conveyor 74 of the transport system 16 to a second mold latch mechanism 82. The mold latch mechanism 82 operates to engage the clamping device 46 of the molds at the conclusion of the reassembly process.

Using the conveyor 74 of the transfer system 16, the pre-treated, reassembled and clamped mold 12 is then either transported from the mold latching mechanism 82 of the separator-assembler apparatus 20 to the injection apparatus 14 as shown in FIG. 1C. Alternatively, the molds may be provided to an apparatus for further pre-treatment of the mold 12 for the next injection process. Upon completion of the pre-treatment steps to the mold, the mold is transported by the conveyor 74 to repeat the molding process.

A method and apparatus for continuously and nonsynchronously molding articles using a self-clamping, pre-loaded mold has been described. The method and apparatus are believed to reduce the overall time required to process each molded article, eliminate the formation of flash on the molded articles, and compensate for shrinkage of the molding material during the curing process. The molded articles produced using this method and apparatus have characteristics substantially equal to those manufactured pursuant to prior molding techniques. Additionally, the method and apparatus of the present invention require relatively small space, but may be readily expanded to increase the size of the system and thus the number of parts to be molded. The preferred form of the method and apparatus have been described above. However, with the present disclosure in mind it is believed that obvious alterations to the preferred embodiment, to achieve comparable features and advantages in other molding methods and apparatus, will become apparent to those of ordinary skill in the art.

We claim:

1. Apparatus for removing molded articles from a continuous molding system, said apparatus comprising at least one multi-section, self-clamping mold, a disassembly station having means for unclamping and separating said multi-section mold into sections, at least one work station having means for moving and locating said mold sections in horizontal, co-planar relationship, locating said sections to permit the removal of molded articles, and pre-treating said sections for the next injection of material into said mold, and a reassembly station having means for aligning said mold sections and clamping said multi-section mold in clamped condition, wherein said reassembly station includes means for moving and locating said mold sections from said horizontal, co-planar relationship to an adjacent, vertical, parallel planar relationship.

2. The apparatus of claim 1 wherein said one work station includes means for removing a molded article from at least one section of said multi-section mold, and a second work station includes means for cleaning and inspecting said mold sections for injection molding.

3. The apparatus of claim 2 further comprising a controller system for controlling movement of said mold sections.

4. Apparatus for removing molded articles from a continuous molding system, said molding system including at least one multi-section, self-clamping mold, the sections of said mold adapted to separate from one another by non-horizontal movement, said apparatus comprising a disassembly station having means for unclamping said multi-section mold into sections and for moving said sections in a non-horizontal direction to separate said sections from one another, at least one work station having means for
(a) moving said mold sections horizontally with respect to one another to locate said mold sections in horizontally-spaced relationship with respect to one another, and
(b) locating said sections to permit the removal of molded articles, and a reassembly station having means for aligning said mold sections and clamping said multi-section mold in clamped condition.

5. The apparatus of claim 4, wherein said mold sections are moved vertically to separate said sections from one another at said disassembly station.

6. The apparatus of claim 5, wherein said mold sections are moved into a horizontally co-planar relationship at said work station.

7. The apparatus of claim 6, wherein said mold sections are adapted to move through said work station in a travel direction, and to move laterally with respect to said travel direction so that said mold sections are arranged in a side-by-side relation with respect to one another when in said horizontally co-planar relationship at said work station.

8. The apparatus of claim 4, wherein said mold sections are movable into a horizontally co-planar relationship at said work station.

9. The apparatus of claim 8, wherein said mold sections are adapted to move through said work station in a travel direction, and to move laterally with respect to said travel direction so that said mold sections are arranged in a side-by-side relation with respect to one another when in said horizontally co-planar relationship at said work station.

10. The apparatus of claim 4, wherein said work station further includes means for pre-treating said mold sections for the next injection of material into said mold.

11. The apparatus of claim 4, wherein said reassembly station has means for stacking said mold sections one atop the other for placing said mold in its clamped condition, and further wherein said work station includes means to arrange said mold sections in side-by-side relation in said work station.

* * * * *